Patented Aug. 18, 1936

2,051,409

UNITED STATES PATENT OFFICE 2,051,409

DISPERSION OF NONSAPONIFIABLE RESIN AND PROCESS OF MAKING SAME

John A. Kenney, Plainfield, N. J., assignor to The Barrett Company, New York, N. Y., a corporation of New Jersey No Drawing. Application January 26, 1934, Serial No. 707,527

3 Claims. (Cl. 134—26)

My invention relates to dispersed systems of resinous materials and particularly to dispersions, such as emulsions or suspensions of resins of the coumarone-indene type.

Dispersions of saponifiable resins, such as rosin, have been used heretofore in the form of rosin size or rosin soaps, for the sizing of paper and in the formation of paper board and similar products. Resins such as paracoumarone, para-indene, and similar resins derived from coal tar distillates are cheap and form excellent sizing materials and binding agents but such resins are not saponifiable. When it is desired to use resins of this type for sizing or waterproofing materials, the resins have heretofore been dissolved in an organic solvent which is subsequently volatilized. The latter process has the objection that solvents employed for dissolving resins of the coumarone-indene type are expensive and many are inflammable. Furthermore, their use usually requires the installation of relatively costly solvent-recovery apparatus.

I have discovered that unsaponifiable resins, and particularly resins of the coumarone-indene type, can be dispersed or emulsified directly in a form satisfactory for use in a variety of ways, and that such dispersions can be produced without employing large amounts of expensive and inflammable solvents for the resins.

Products obtained by the practice of my invention can be added to paper pulp or fiber stock in a beater as sizing or binding agents for the fibers, or the dispersions may be used in treating or impregnating fiber board, leather and similar material, and for numerous other purposes. When the dispersions are used in treating paper, fibrous pulp or the like, the products obtained have increased resistance to the action of water and alkali and can be made comparatively flexible or rigid, as desired.

Among the objects of my invention are to overcome difficulties and objections heretofore presented to the use of unsaponifiable resins of the coumarone-indene type in the manufacture and treatment of paper, fiber, textiles and the like and for various other purposes; to produce dispersions of unsaponifiable resins, such as resin of the coumarone-indene type, and to provide simple and economical methods for producing dispersions of such resins.

These and other objects and features of my invention will appear from the following description thereof, in which reference is made to typical formulae and the methods of procedure for producing dispersions of resins.

In accordance with my invention, the resin is dispersed to form an emulsion or suspension that is relatively stable or which separates only very slowly. The nature of the dispersion produced is largely dependent upon the manner in which the resin is treated. It seems probable that in some instances, the resin is emulsified, whereas in other instances, the resin is probably suspended in the form of minute solid particles.

I have found that dispersions of resins of the coumarone-indene type can be produced by melting the resin and distributing the molten resin throughout a water solution of a dispersing agent by grinding, stirring or whipping the mixture of materials or by similar mechanical treatment, as, for example, in a colloid mill, the temperature of the solution being maintained below its boiling point in the case where the resin has a melting point below the boiling point of the solution. If a more stable emulsion is desired, i. e., one which it is desired to store for a considerable period of time upon formation, a limited amount of saponifiable material may be added to the dispersion to stabilize the same, such material being added to either the dispersing agent or to the resin before mixing these materials, or the saponifiable material may be added to the resin and dispersing agent during the agitation thereof.

My invention, as herein described, is applicable to the treatment of a wide range of resins of the coumarone-indene type which have either high or low melting points, i. e., which are of either the hard or the soft grades.

In forming the dispersion, it is preferred to employ silicate of soda, preferably containing a high ratio of $SiO_2$ to $Na_2O$, that is, a ratio of about 3 or more parts of $SiO_2$ to 1 part of $Na_2O$ as the dispersing agent. For example, I may employ a silicate solution having a density of 42.5° Baumé and containing 39.6 per cent by weight of sodium silicate in which there is about 3.25 parts by weight of $SiO_2$ to 1 part of $Na_2O$. I have also employed a silicate solution having a density of about 33.5° Baumé and containing 31.3 per cent of silicate of soda having 3.86 parts by weight of $SiO_2$ to 1 part of $Na_2O$. Although I prefer to employ a solution containing 30 per cent or more by weight of silicate of soda which has a high ratio of $SiO_2$ to $Na_2O$, I may employ other forms, grades or solutions of soluble silicates. Instead of the soluble silicate dispersing agent, I may use sodium carbonate, caustic soda, ammonium hydroxide or trisodium phosphate. In the formation of more stable dispersions, i. e., dispersions which will be stored for a considerable period of time and will not be employed soon after formation, a regulated amount, as hereinafter pointed out, of saponifiable material may be added to the dispersion to stabilize the same. The incorporation of a relatively large proportion of saponifiable material in the dispersion deleteriously affects the waterproofing properties of the sheets or boards made therefrom. In accordance with this invention involving the incorporation of saponifiable material in the non-saponifiable resin emulsion or dispersion, the amount of saponifiable material added is carefully regulated with respect to the non-saponifiable resin content. For example, in emulsifying paracoumarone resin having a melting point below 40° C., 1 part of saponifiable material may be added for every 50 parts of resin. In emulsifying harder resins, more saponifiable material may be employed. In the emulsification of paracoumarone resin melting above 80° C., the amount of saponifiable material added to the resin mixture is preferably one part or more saponifiable material to 25 parts paracoumarone resin. Suitable saponifiable materials which may be employed include rosin, rosin oil, rosin soap, linseed oil, linseed oil fatty acids, abietic acid, oleic acid and other aliphatic acids and saponifiable materials. The saponifiable material may be employed in conjunction with clays such as bentonite, kaolin, or china clay. A non-aqueous solvent, e. g., toluene, may also be added and stirred into the product, but preferably this solvent should be added to the resin before emulsification.

The following example is illustrative of a preferred method of practicing my invention to produce dispersions or emulsions of the oil-in-water type:

Resin of the coumarone-indene type having a melting point below about 40° C. is melted and while the resin is still molten, I add 1 part by weight of the resin to 2 parts by weight of a solution of silicate of soda, whipping the materials together by means of a high speed stirring device.

The product resulting from the process as described in the foregoing example is an oil-in-water dispersion, an emulsion of resin in water which will not separate after standing for several weeks. The product has sufficient body to be handled and worked easily in a beater or other apparatus for distributing the resin onto the fiber of a pulp such as paper stock. This dispersion is also capable of dilution with water when a thin dispersion is desired.

Any suitable type of apparatus may be employed for agitating, mixing or whipping the materials together or otherwise blending them to produce the dispersions of the present invention, but I prefer to employ apparatus having a bladed propeller driven at high speed by means of a motor or other suitable driving mechanism, or a suitable colloid mill of well-known type.

When employing the above-described methods of procedure for treating a resin having a melting point appreciably above atmospheric temperature, it may be preferable in some cases to heat the materials during the formation of the dispersion. This may easily be effected by heating the vessel in which the materials are treated by means of steam or hot water. The heating may be carried out under pressure, when desirable, or in a closed vessel fitted with a reflux condenser to return evaporated water (or solvent, if such is used) to the mixture.

The products obtained by the use of my invention described above may vary considerably in properties and composition. For instance, I have produced dispersions of resins by the use of the methods of procedure suggested above that contain an amount of resin equal to from about 5 per cent to 70 per cent of the weight of water used in producing the dispersions and I have produced dispersions of the resins without the use of any saponifiable material in the process.

The products obtained in the practice of my invention are adapted for use in the sizing of paper, in the formation of fiber board and laminated products, for the impregnation or treatment of paper, fabrics, leather and the like and for numerous other purposes where resins are employed.

In using the products obtained for sizing paper or for producing fiber board, the dispersion may be added to a pulp of paper or fiber in a beater, the amount and character of the dispersion used being regulated to obtain the desired proportions of resin to fiber. The dispersion is intimately mixed with the pulp and a precipitant or flocculating agent such as alum or other electrolyte is added to the materials to cause the resin to precipitate on the fiber. The addition of the alum causes the breaking down of the dispersion, the dispersed particles being deposited on the fiber. In the case of higher melting point paracoumarone resins, e. g., resins melting above 25° C., the dispersed particles will be deposited in solid, non-adhesive condition onto the fibers. Hence, the mixture of fibrous material and paracoumarone resin particles can be sheeted on a paper-making machine without adherence of the binder particles to the paper-making instrumentalities. The binder particles are coalesced and substantially homogeneously distributed throughout the paper upon the drying and calendering of the paper. The pulp may be formed into sheets of desired thickness and the sheets dried and pressed, if desired, to obtain the desired product.

The invention herein may be employed to form stable emulsions or dispersions of other substantially non-saponifiable hard resinous materials. For example, hard resins made from cracked petroleum, as well known in the petroleum art, "Glyptal" resins, "Bakelite," pitch resins, and the substantially nonsaponifiable ester gum may be emulsified in the manner hereinabove described for the emulsification of hard resins of the coumarone-indene type. Resins made by the polymerization of cracked distillates obtained from petroleum and/or natural gas have properties similar to the properties of paracoumarone resins and for many purposes may be used interchangeably with paracoumarone resins. The term "paracoumarone resin-like material" as used in the claims herein is intended to be a generic term to include both paracoumarone resin and resin obtained by the polymerization of such cracked distillates.

The term "dispersions" as used throughout the specification and claims in referring to the products obtained in practicing my process is intended to include all such products as I have described above whether they are suspensions or emulsions.

I claim:

1. The method which consists in melting a resin of the coumarone indene type, having a melting point below about 40° C., while the resin is still molten adding one part by weight of the resin to two parts by weight of a solution of silicate of soda, and whipping these materials together by means of a high speed stirring device until a relatively stable emulsion is formed.

2. The method of producing a comparatively stable dispersion of a resin of the coumarone indene type, free of saponifiable material, which dispersion is particularly adapted for sizing and waterproofing paper, comprising the step of adding the said resin in liquefied form to a solution consisting of alkali silicate and water and agitating the resultant mixture of resin and water solution of alkali silicate to produce said comparatively stable dispersion.

3. A comparatively stable dispersion of resin of the coumarone indene type, particularly adapted for sizing and waterproofing fibrous sheets during the manufacture thereof, said dispersion being free of saponifiable material and consisting of liquefied resin of the coumarone indene type dispersed in a solution consisting of alkali silicate and water.

JOHN A. KENNEY.